United States Patent
Chu

(10) Patent No.: US 8,230,161 B2
(45) Date of Patent: Jul. 24, 2012

(54) DATA BACKUP METHOD FOR A FLASH MEMORY AND CONTROLLER AND STORAGE SYSTEM USING THE SAME

(75) Inventor: Chien-Hua Chu, Hsinchu County (TW)

(73) Assignee: Phison Electronics Corp., Miaoli (TW)

( * ) Notice: Subject to any disclaimer, the term of this patent is extended or adjusted under 35 U.S.C. 154(b) by 296 days.

(21) Appl. No.: 12/646,406

(22) Filed: Dec. 23, 2009

(65) Prior Publication Data

US 2011/0113184 A1    May 12, 2011

(30) Foreign Application Priority Data

Nov. 6, 2009 (TW) ................................ 98137837 A

(51) Int. Cl.
*G06F 12/02* (2006.01)
(52) U.S. Cl. .. 711/103; 711/173; 711/202; 711/E21.008
(58) Field of Classification Search .................. 711/162, 711/103, 112, 154, E12.002, E12.008
See application file for complete search history.

(56) References Cited

U.S. PATENT DOCUMENTS

| | | | | |
|---|---|---|---|---|
| 2005/0251617 A1* | 11/2005 | Sinclair et al. | ................ | 711/103 |
| 2010/0042775 A1* | 2/2010 | Yeh | ............................... | 711/103 |
| 2010/0281207 A1* | 11/2010 | Miller et al. | ................... | 711/103 |

* cited by examiner

*Primary Examiner* — Pierre-Michel Bataille
(74) *Attorney, Agent, or Firm* — J.C. Patents

(57) ABSTRACT

A data backup method for backing up data temporarily stored in a cache memory of a flash memory storage device is provided, where the flash memory storage device has a plurality of physical units. The data backup method includes logically grouping a portion of the physical units into a data area and a cache area. The data backup method also includes determining whether a trigger signal is received; and when the trigger signal is received, copying the data temporarily stored in the cache memory into the cache area. Accordingly, the data backup method can quickly write the data temporarily stored in the cache memory into the physical units, thereby preventing a time out problem which may occur in the flash memory storage device.

20 Claims, 11 Drawing Sheets

DATA BACKUP METHOD FOR A FLASH MEMORY AND CONTROLLER AND STORAGE SYSTEM USING THE SAME

CROSS-REFERENCE TO RELATED APPLICATION

This application claims the priority benefit of Taiwan application serial no. 98137837, filed on Nov. 6, 2009. The entirety of the above-mentioned patent application is hereby incorporated by reference herein and made a part of this specification.

BACKGROUND

1. Technology Field

The invention relates to a data backup method and particularly to a data backup method for backing up data temporarily stored in a cache memory of a flash memory storage device, a flash memory controller, and a flash memory storage system using the same.

2. Description of Related Art

The growth of digital cameras, mobile phones, and MP3 players has been rapid in recent years. Consequently, demands of consumers for storage media of digital contents have increased tremendously. Since flash memory has a characteristics of non-volatile data, energy saving, compact size, and no mechanical construction, the flash memory is suitable for users to carry around as the storage media for transferring and exchanging the digital files. Solid State Drive (SSD) is an example of utilizing the flash memory as the storage media, and has been widely applied in the computer host as a main hard disk.

Generally speaking, in designs of a flash memory storage system, flash memory physical units of the flash memory storage system are grouped into a plurality of physical units and the physical units are further grouped into a data area and a spare area. The physical units in the data area are used for storing valid data written by a write command, and the physical units in the spare area are used for replacing the physical units in the data area during the execution of the write command. More specifically, when the flash memory storage system receives the write command from the host to update data in a physical unit in the data area, the flash memory storage system first gets one physical unit from the spare area, and then writes valid old data in the physical unit, which is to be updated, in the data area together and the new data to be written into a physical unit gotten from the spare area. Further, the physical unit written with the new data is associated to the data area, and the original physical unit, which is to be updated, in the data area is erased and associated to the spare area. In order for the host to properly access the physical units that store data in an alternate manner, the flash memory storage system provides logical units to the host. That is, the flash memory storage system records and updates a mapping relationship between the logical units and the physical units in the data area with the logical address-physical address mapping table to reflect an alternation of the physical units. Therefore, the host is only required to perform writing operation based on the logical units provided and the flash memory storage system would read data from or write data into the physical units mapped according to the logical address-physical address mapping table.

However, compared with operations of the computer host (e.g., data transmission), time required by writing data for a flash memory storage device to perform the above-described the alternation of the physical units is relatively longer. Therefore, in order to enhance efficiency of the flash memory storage device, a cache memory is generally configured in the flash memory storage device for shortening time required for completing related commands.

For example, under a case where the flash memory storage device takes relatively more time to complete the write commands from the computer host system, when the computer host system gives the write command the flash memory storage system, the flash memory storage system may temporarily stores the data, which is to be written, into the cache memory, and replies the computer host system that the write command is completed. Thereafter, the flash memory storage device writes the data into the flash memory therein during the non-busy period.

However, in a framework of utilizing the flash memory storage device of the cache memory, if the cache memory temporarily stores data of a relatively large amount of data, or the data stored temporarily is required to be written into a plurality of different logical units, when the computer host system gives a command of flushing the cache memory to the flash memory storage device, the flash memory storage device takes a very long time to write the data temporarily stored in the cache memory into the physical units, thereby causing a severe delay on operations of the computer host system.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention is directed to a data backup method capable of backing up data temporarily stored in a cache memory of a flash memory storage device quickly when a trigger signal is received by the flash memory storage device.

The invention is directed to a flash memory controller capable of backing up data temporarily stored in a cache memory of a flash memory storage device quickly when a trigger signal is received by the flash memory storage device.

The invention is directed to a flash memory storage device capable of backing up data temporarily stored in a cache memory quickly when a trigger signal is received.

An exemplary embodiment of the invention provides a data backup method for backing up a plurality of data temporarily stored in a cache memory of a flash memory storage device. The flash memory storage device has a plurality of physical units and each of the physical units has a plurality of physical addresses. The data backup method includes providing a flash memory controller and a plurality of logical addresses and grouping the logical addresses into a plurality of logical units. The data backup method also includes logically grouping a portion of the physical units into a data area and a cache area by using the flash memory controller. Here, the logical addresses are mapped to the data area or the cache area, and every data temporarily stored in the cache memory corresponds to one of the logical addresses mapped to the data area. The data backup method further includes determining whether a trigger signal is received by using the flash memory controller. And, the data backup method includes, when the trigger signal is received, at least a portion of the data temporarily stored in the cache memory, copying into the cache area by the flash memory controller, Herein, the data temporarily stored in the cache memory include at least one first data and one second data, and the first data and the second data are continuously written into the adjacent physical addresses in the cache area. In addition, the first data and the second data correspond to the discontinuous logical addresses within the same logical block of the logical blocks respectively.

An exemplary embodiment of the invention provides a flash memory controller configured in a flash memory storage device. The flash memory storage device includes a cache memory and a plurality of physical units. Each of the physical units has a plurality of physical addresses, and the cache memory stores a plurality of data temporarily. The flash memory controller includes a microprocessor unit, a flash memory interface unit, a host interface unit, and a memory management unit. The flash memory interface unit is coupled to the microprocessor unit and configured for coupling to the physical units. The host interface unit is coupled to the microprocessor unit and configured for coupling to the host system. The memory management unit is coupled to the microprocessor unit and configured for providing a plurality of logical addresses and grouping the logical addresses into a plurality of logical units. Moreover, the memory management unit logically groups a portion of the physical units into a data area and a cache area. The logical addresses are mapped to the data area or the cache area. Every data temporarily stored in the cache memory corresponds to one of the logical addresses mapped to the data area. The memory management unit then determines whether a trigger signal is received by the microprocessor unit. When the trigger signal is received, the memory management unit copies at least a portion of the data temporarily stored in the cache memory into the cache area. The data temporarily stored in the cache memory include at least one first data and one second data, and the first data and the second data are continuously written into the adjacent physical addresses in the cache area. Further, the first data and the second data correspond to the discontinuous logical addresses within the same logical block of the logical blocks respectively.

An exemplary embodiment of the invention provides a flash memory storage system including a flash memory chip, a connector, a flash memory controller, and a cache memory. The flash memory chip has a plurality of physical units. The connector is configured for coupling to a host system. The flash memory controller is coupled to the flash memory chip and the connector for providing a plurality of logical addresses and grouping the logical addresses into a plurality of logical units. The cache memory is coupled to the flash memory controller for storing a plurality of data temporarily. Here, the flash memory controller logically groups a portion of the physical units into a data area and a cache area. The logical addresses are mapped to the data area or the cache area. Every data temporarily stored in the cache memory corresponds to one of the logical addresses mapped to the data area. Also, the flash memory controller determines whether a trigger signal is detected. When the trigger signal is detected, the flash memory controller copies at least a portion of the data temporarily stored in the cache memory into the cache area. The data temporarily stored in the cache memory include at least one first data and one second data, and the first data and the second data are continuously written into the adjacent physical addresses in the cache area. Furthermore, the first data and the second data correspond to the discontinuous logical addresses within the same logical block of the logical blocks respectively. Additionally, when at least one host write command is received, the flash memory controller writes the first data and the second data into the data area according to the corresponding logical addresses of the first data and the second data respectively.

Accordingly, the data backup method, the flash memory controller, and the flash memory storage device using the same of the invention prevent the time out which probably results from the flush command given by the host system. And, the data backup method, the flash memory controller, and the flash memory storage device using the same of the invention prevent the loss of data in the cache memory which results from sudden disconnection.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
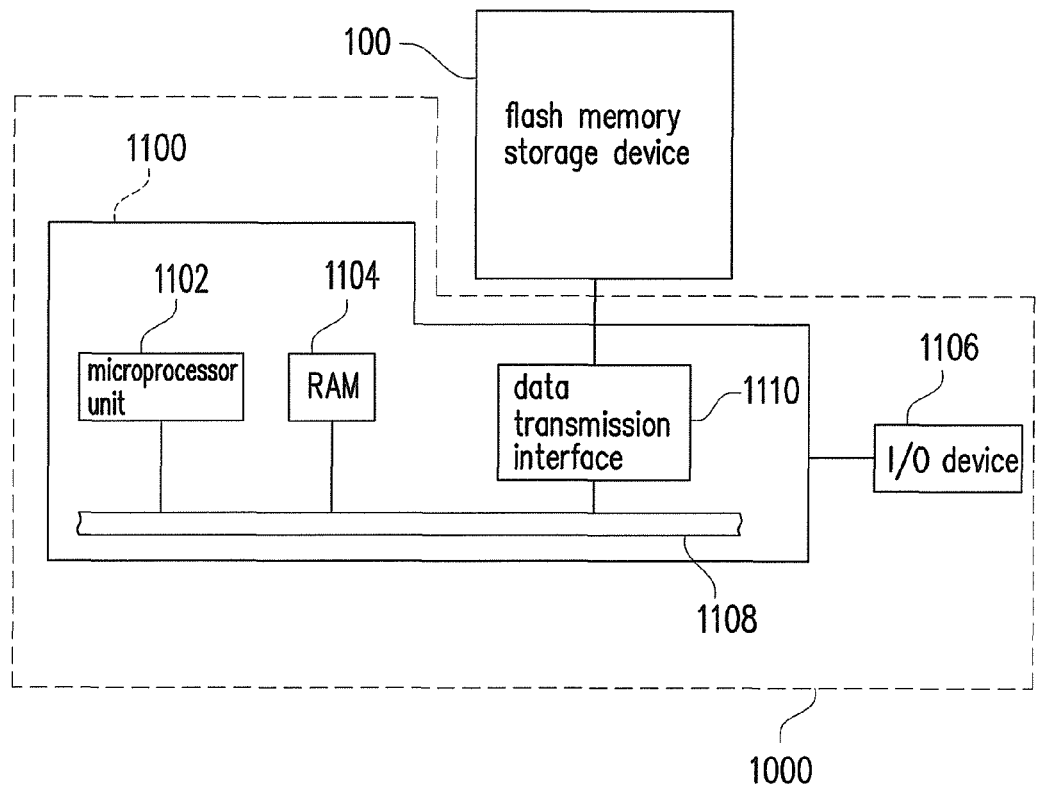
FIG. 1A illustrates a schematic diagram of a host system using a flash memory storage device according to a first exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the description of embodiments, and/or shown in the drawings. As used herein, "at least one", "one or more", and "and/or" are open-ended expressions that are both conjunctive and disjunctive in operation. For example, each of the expressions "at least on of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

A flash memory storage device generally includes a flash memory chip and a controller (also referred to as a control circuit). The flash memory storage device is usually used together with a host system so that the host system can write data into or read data from the flash memory storage device. In addition, in another exemplary embodiment, a flash memory storage device could include an embedded flash memory and a software that can be executed by a host system and substantially served as a controller of the embedded flash memory.

[First Exemplary Embodiment]

FIG. 1A is a schematic diagram of a host system using a flash memory storage device according to a first exemplary embodiment of the invention.

Figure 1B:
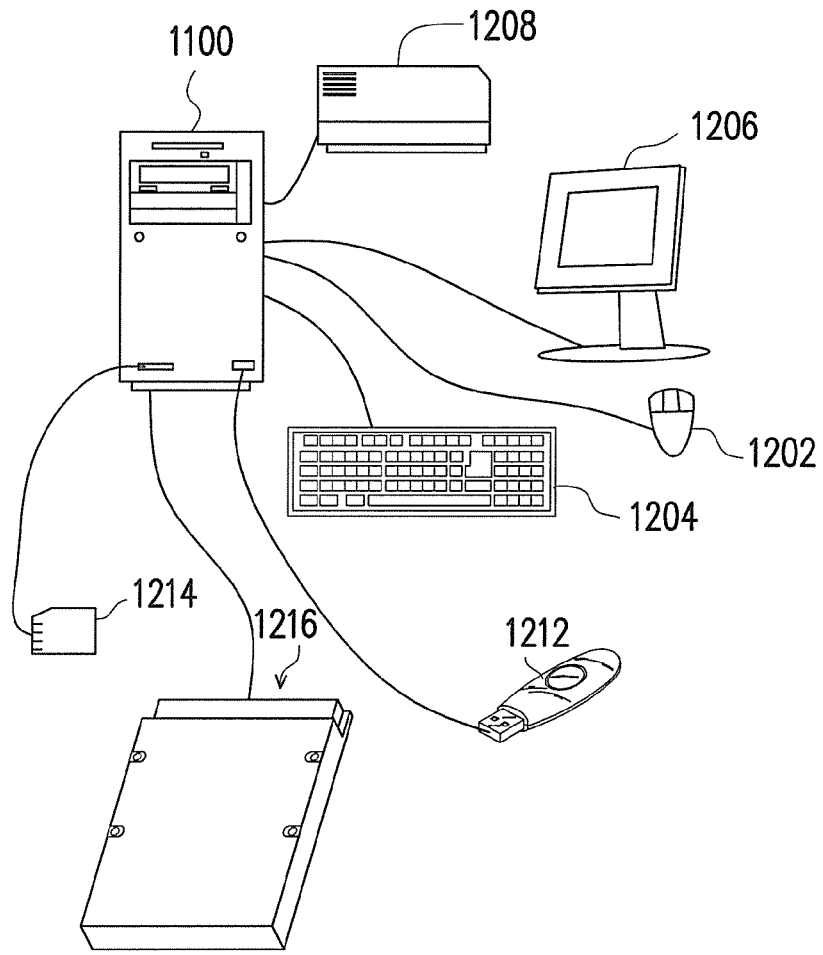
FIG. 1B illustrates a diagram of a computer, an input/output (I/O) device, and a flash memory storage device according to an exemplary embodiment of the invention.

Referring to FIG. 1A, a host system 1000 includes a computer 1100 and an input/output (I/O) device 1106. The computer 1100 includes a microprocessor unit 1102, a random access memory (RAM) 1104, a system bus 1108, and a data transmission interface 1110. The I/O device 1106 includes a mouse 1202, a keyboard 1204, a display 1206, and a printer 1208, as shown in FIG. 1B. It should be understood that the devices illustrated in FIG. 1B are not intended to limit the scope of the I/O device 1106, and the I/O device 1106 may further include other devices.

In the present embodiment, a flash memory storage device 100 is coupled to other devices of the host system 1000 through the data transmission interface 1110. The host system 1000 can write data into or read data from the flash memory storage device 100 through the CPU 1102, the RAM 1104, and the I/O device 1106. The flash memory storage device 100 may be a flash drive 1212, a memory card 1214, or a solid state drive (SSD) 1216, as shown in FIG. 1B.

Figure 1C:
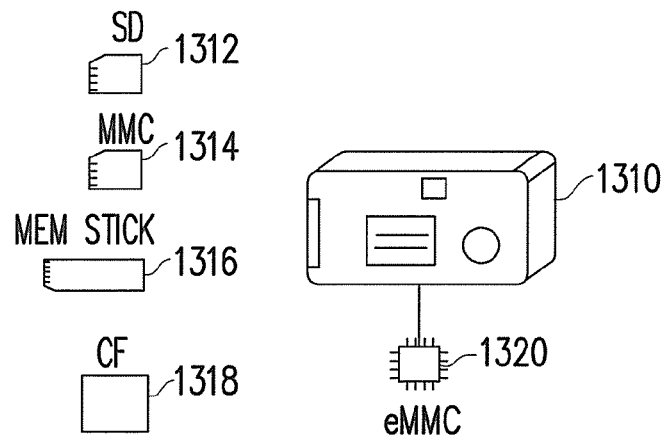
FIG. 1C illustrates a diagram of a host system and a flash memory storage device according to another exemplary embodiment of the invention.

Generally speaking, the host system 1000 may be any system that can store data. Even though the host system 1000 is described as a computer system in the present exemplary embodiment, in another exemplary embodiment of the invention, the host system 1000 may also be a digital camera, a video camera, a communication device, an audio player, or a video player, and etc. For example, when the host system is a digital camera 1310, the flash memory storage device is then a SD card 1312, a MMC card 1314, a memory stick 1316, a CF card 1318, or an embedded storage device 1320 (as shown in FIG. 1C). The embedded storage device 1320 includes an embedded MMC (eMMC). It should be mentioned that the eMMC is directly coupled to a substrate of the host system 1000.

Figure 2:
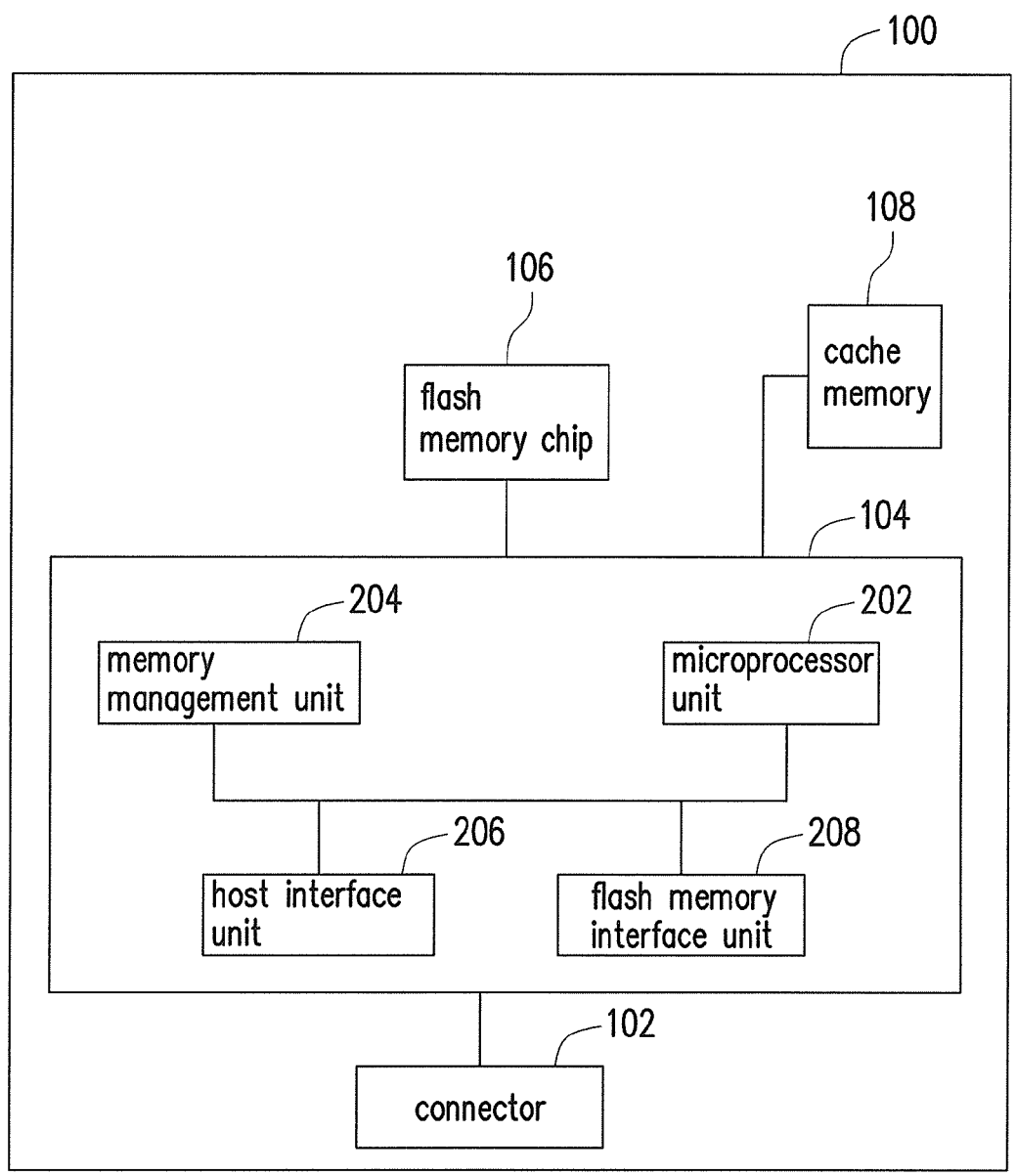
FIG. 2 is a schematic block diagram of a flash memory controller according to another exemplary embodiment of the invention.

FIG. 2 is a general block diagram of the flash memory storage device 100 in FIG. 1A.

Referring to FIG. 2, the flash memory storage device 100 includes a connector 102, a flash memory controller 104, a flash memory chip 106, and a cache memory 108.

The connector 102 is coupled to the flash memory controller 104 and used for coupling to the host system 1000. In the present exemplary embodiment, the connector 102 is a serial advanced technology attachment (SATA) connector. However, the invention is not limited thereto, and the connector 102 may also be a parallel advanced technology attachment (PATA) connector, a universal serial bus (USB) connector, an Institute of Electrical and Electronic Engineers (IEEE) 1394 connector, a peripheral component interconnect (PCI) express connector, a secure digital (SD) interface connector, a memory stick (MS) interface connector, a multi media card (MMC) interface connector, a compact flash (CF) interface connector, an integrated device electronics (IDE) connector, or other suitable connectors.

The flash memory controller 104 executes a plurality of logic gates or control commands implemented in a hardware form or a firmware form and performs various data operations such as data writing, reading, and erasing in the flash memory chip 106 according to commands of the host system 1000. The flash memory controller 104 includes a microprocessor unit 202, a memory management unit 204, a host interface unit 206, and a flash memory interface unit 208.

The microprocessor unit 202 is a main control unit of the flash memory controller 104. The microprocessor unit 202 cooperates with the memory management unit 204, the host interface unit 206, and the flash memory interface unit 208 to carry out various operations of the flash memory storage device 100.

The memory management unit 204 is coupled to the microprocessor unit 202, and executes a data writing mechanism and a block management mechanism according to the present exemplary embodiment. Below, the operation of the memory management unit 204 is described in detail with reference to accompanying drawings.

In the present exemplary embodiment, the memory management unit 204 is implemented in the flash memory controller 104 in a firmware form. For example, the memory management unit 204 including a plurality of control commands is burned into a program memory (for example, a read only memory (ROM)), and the program memory is embedded into the flash memory controller 104. When the flash memory storage device 100 is in operation, the control commands of the memory management unit 204 are executed by the microprocessor unit 202 to accomplish the data backup mechanism, the data writing mechanism, and the block management mechanism according to the present embodiment.

In another exemplary embodiment of the invention, the control commands of the memory management unit 204 are also stored in a specific area (for example, the system area of a flash memory chip exclusively used for storing system data) of the flash memory chip 106 as program codes. Similarly, the control commands of the memory management unit 204 are executed by the microprocessor unit 202 when the flash memory storage device 100 is in operation. In another exemplary embodiment of the invention, the memory management unit 204 could be implemented in the flash memory controller 104 in a hardware form.

The host interface unit 206 is coupled to the microprocessor unit 202, and receives and identifies commands and data sent from the host system 1000. Namely, the commands and data sent from the host system 1000 are transmitted to the microprocessor unit 202 through the host interface unit 206. In the present exemplary embodiment, the host interface unit 206 is a SATA interface corresponding to the connector 102.

However, it should be understood that the invention is not limited thereto, and the host interface unit 206 can also be a PATA interface, a USB interface, an IEEE 1394 interface, a PCI express interface, a SD interface, a MS interface, a MMC interface, a CF interface, an IDE interface, or other suitable data transmission interfaces.

The flash memory interface unit 208 is coupled to the microprocessor unit 202 and configured for accessing the flash memory chip 106. Namely, data to be written into the flash memory chip 106 are converted by the flash memory interface unit 208 into a format acceptable to the flash memory chip 106.

Figure 3:
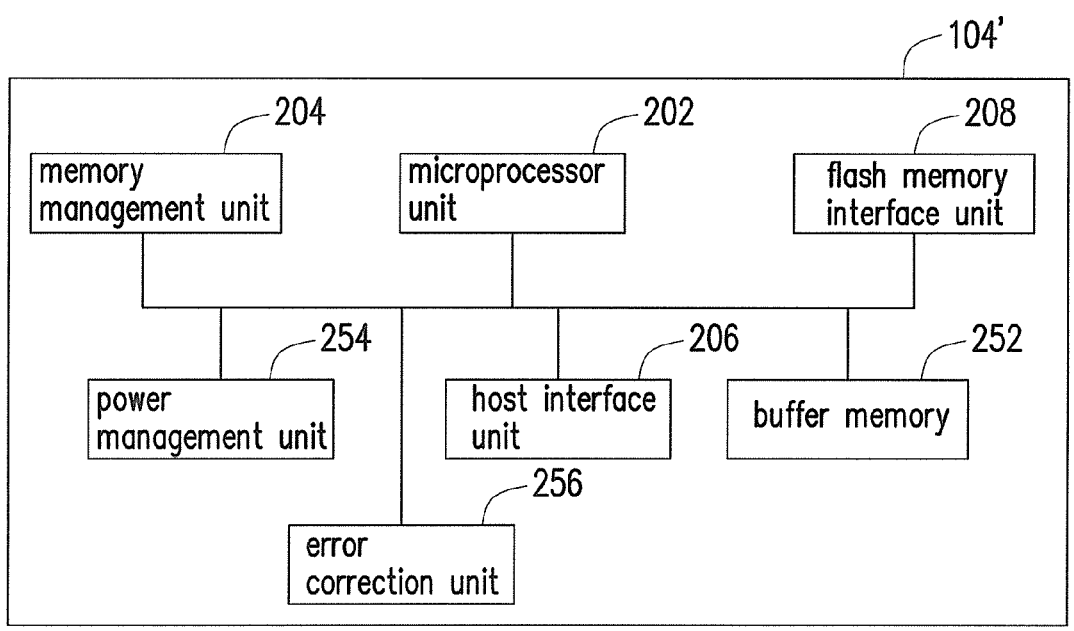
FIG. 3 is a schematic block diagram illustrating a flash memory chip according to the first exemplary embodiment of the invention.

In another exemplary embodiment of the invention, the flash memory controller further includes other functional modules. FIG. 3 is a schematic block diagram of a flash memory controller according to another exemplary embodiment of the invention.

Referring to FIG. 3, besides the microprocessor unit 202, the memory management unit 204, the host interface unit 206, and the flash memory interface unit 208, a flash memory controller 104' of another exemplary embodiment of the invention further includes a buffer memory 252, a power management unit 254, and an error correction unit 256.

The buffer memory 252 is coupled to the microprocessor unit 202 and configured for temporarily storing data and commands from the host system 1000 or data from the flash memory chip 106.

The power management unit 254 is coupled to the microprocessor unit 202, and configured to control the power supply of the flash memory storage device 100.

The error correction unit 256 is coupled to the microprocessor unit 202, and configured for executing an error correction procedure to ensure data accuracy. To be specific, when the memory management unit 204 receives a host write command from the host system 1000, the error correction unit 256 generates an error checking and correcting (ECC) code for the data corresponding to the host write command, and the memory management unit 204 writes the data and the corresponding ECC code into the flash memory chip 106. Subsequently, when the memory management unit 204 reads the data from the flash memory chip 106, the memory management unit 204 simultaneously reads the corresponding ECC code, and the error correction unit 256 executes the error correction procedure on the data read according to the ECC code.

Referring to FIG. 2, the flash memory chip 106 is coupled to the flash memory controller 104 and configured for storing data. The cache memory 108 is coupled to the flash memory controller 104 and used for temporarily storing the data sent from the host system 1000 or the data read from the flash memory chip 106. Here, the cache memory 108 is a volatile memory. For example, the cache memory 108 is a dynamic random access memory (DRAM) or a static random access memory (SRAM). In another exemplary embodiment, the cache memory 108 is also a non-volatile memory, such as a single level cell (SLC) NAND or a multi level cell (MLC) NAND in which only fast pages are used for storing data.

Figure 4:
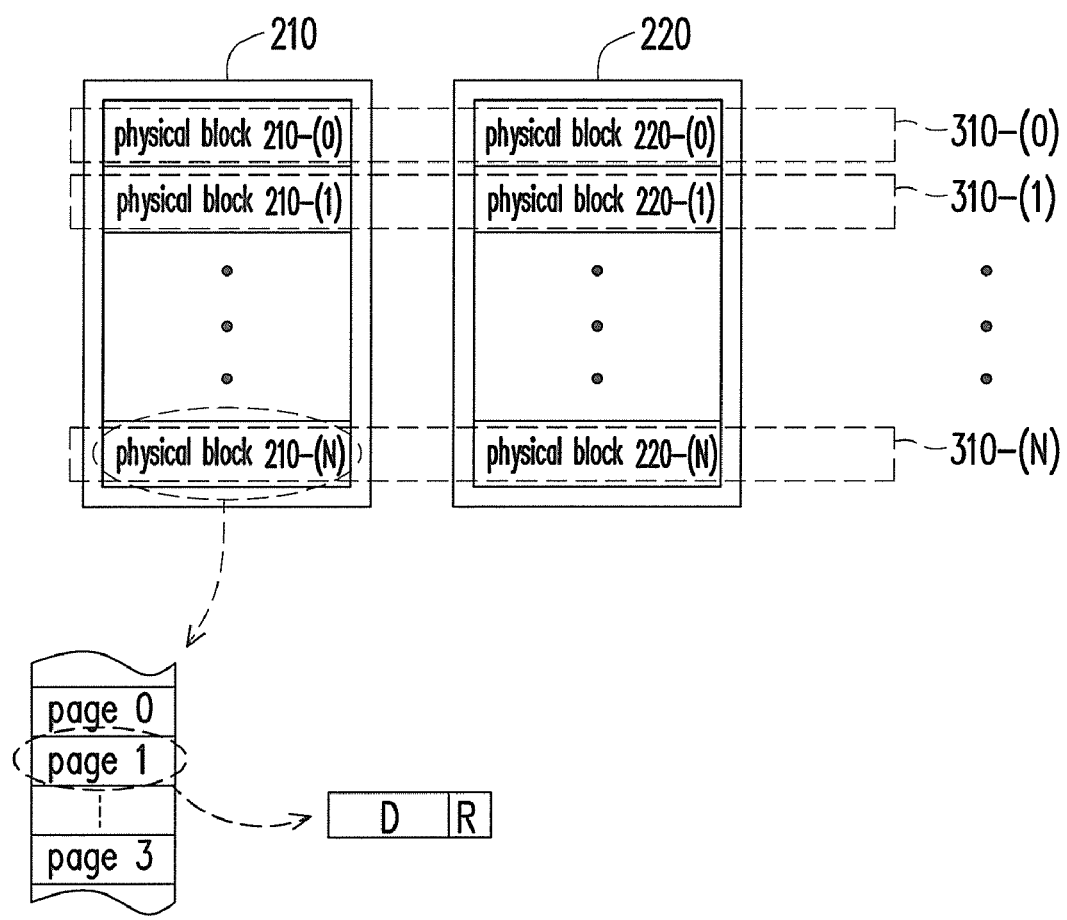
FIG. 4 is a schematic block diagram showing a flash memory chip according to one exemplary embodiment of the invention.

FIG. 4 is a schematic block diagram showing a flash memory chip according to one exemplary embodiment of the invention.

In the present exemplary embodiment, the flash memory chip 106 includes a first flash memory module 210 and a second flash memory module 220. The first flash memory module 210 has a plurality of physical blocks 210-(0)~210-(N), and the second flash memory module 220 has a plurality of physical blocks 220-(0)~220-(N). It should be noted that although the flash memory chip 106 in the present exemplary embodiment is constituted by two flash memory modules, however, the invention is not limited thereto. In another exemplary embodiment of the invention, the flash memory chip is constituted by one or more flash memory modules. According to the present embodiment, the first flash memory module 210 and the second flash memory module 220 are MLC NAND flash memories. Nevertheless, it should be understood that the invention is not limited thereto. According to another embodiment of the invention, the first flash memory module 210 and the second flash memory module 220 may be SLC NAND flash memories.

The first flash memory module 210 has a plurality of physical blocks 210-(0)~210-(N), and the second flash memory module 220 has a plurality of physical blocks 220-(0)~220-(N). Each physical block is the smallest erasing unit. That is to say, each physical block contains the least number of memory cells that are erased together. Each of the physical blocks is usually divided into a plurality of physical addresses (i.e., pages). Since in the present exemplary embodiment, the first flash memory module 210 and the second flash memory module 220 of the flash memory chip 106 are MLC NAND flash memories, thus a smallest unit for programming is one page. In other words, one page is the smallest unit for writing data or reading data. Each of the pages usually includes a user data area D and a redundancy area R. The user data area is for storing user data, and the redundancy area is for storing system data (e.g., the ECC code). In the present exemplary embodiment, each of the pages of the flash memory chip 106 has 8 kilobyte (KB).

In the present exemplary embodiment, each of the physical blocks has 192 pages. However, it should be understood that the invention is not limited thereto. The invention may also have 128, 256, or other number of pages. In addition, the physical blocks of the first flash memory module 210 and the second flash memory module 220 are usually grouped into a plurality of zones. By managing the physical blocks 210-(0)~210-(N) and the physical blocks 220-(0)~220-(N) in each individual zone, the operation execution becomes more parallel and the complexity of management is simplified.

Moreover, the memory management unit 204 of the flash memory controller 104 logically groups the physical blocks in the first flash memory module 210 and the second flash memory module 220 into a plurality of physical units for management. For example, one physical unit includes two physical blocks, and the physical unit is used as the unit for erasing. In the present exemplary embodiment of the invention, the physical blocks 210-(0)~210-(N) and the physical blocks 220-(0)~220-(N) are logically grouped into physical units 310-(0)~310-(N). It should be understood that the present exemplary embodiment manages the physical units each constituted by two physical blocks. However, the invention is not limited thereto. In another embodiment of the invention, one physical unit is constituted by only one physical block or by more than three physical blocks.

FIGS. 5~8 are schematic diagrams illustrating an operation of a flash memory chip according to an exemplary embodiment of the invention.

Figure 5:
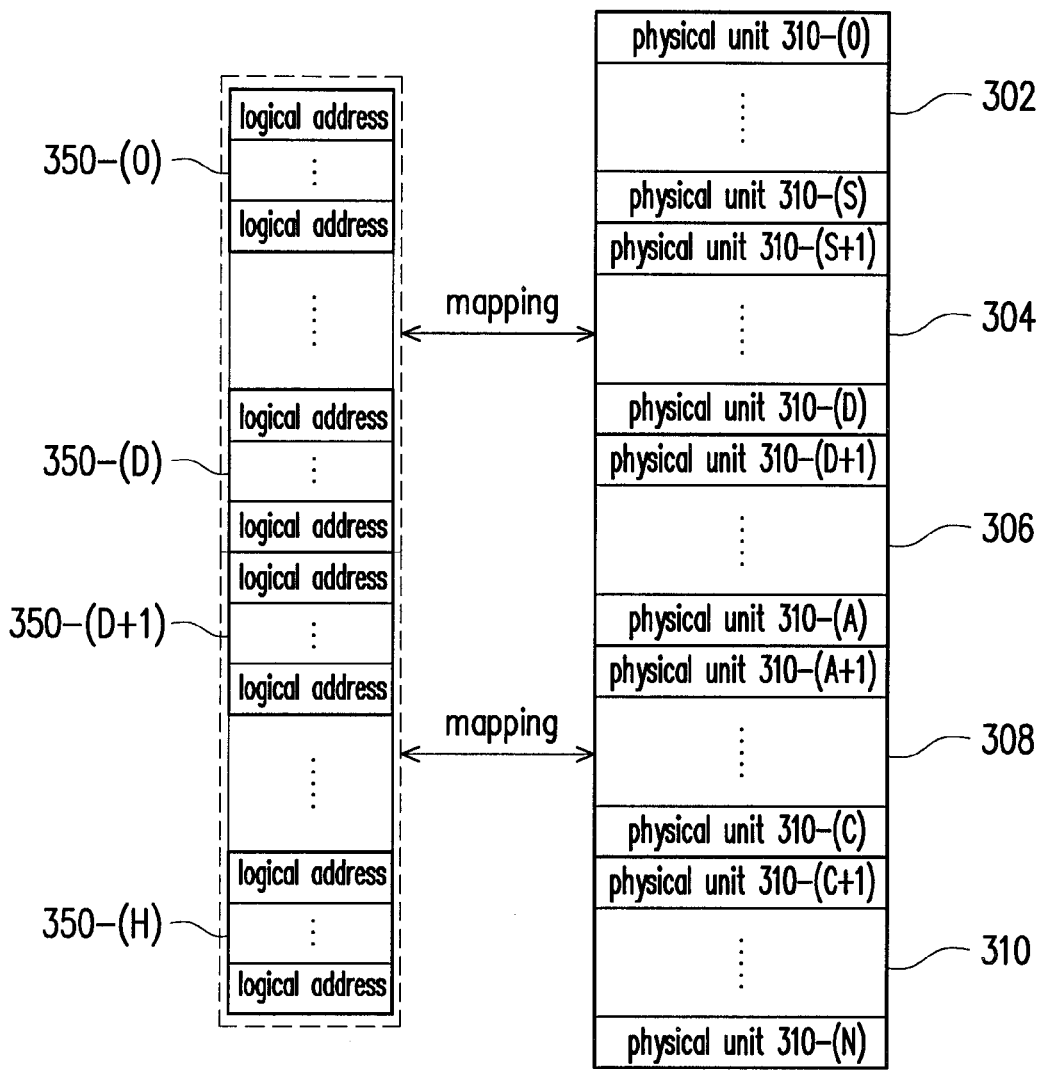
FIGS. 5~8 are schematic diagrams illustrating an operation of a flash memory chip according to an exemplary embodiment of the invention.

Referring to FIG. 5, the memory management unit 204 logically groups the physical units 310-(0)~310-(N) into a system area 302, a data area 304, a spare area 306, a cache area 308, and a backup information area 310. The system area 302 includes physical units 310-(0)~310-(S), the data area 304 includes physical units 310-(S+1)~310-(D), the spare area 306 includes physical units 310-(D+1)~310-(A), the cache area 308 includes physical units 310-(A+1)~310-(C), and the backup information area 310 includes physical units 310-(C+1)~310-(N). In the present exemplary embodiment, the aforementioned S, D, A, C and N are positive integers which represent a number of the physical units configured in each area, and can be varied based on a capacity of the flash memory module used by the manufacturer of the flash memory storage system.

The physical units logically belonging to the system area 302 are used for recording the system data, which include information related to the manufacturer and a model of the flash memory chip, the number of the physical blocks in each flash memory module, the number of the pages in each physical block, and so forth.

The physical units logically belonging to the data area 304 are used for storing user data. Generally, the physical units of the data area 304 are the physical units mapped to the logical units accessed by the host system 1000. That is, the physical units of the data area 304 are units which store valid data.

The physical units logically belonging to the spare area 306 are used for replacing the physical units of the data area 304. Therefore, when the physical units of the spare area 306 are empty or usable, it means that these physical units have no data recorded thereon or have data marked as invalid. In other words, the physical units of the data area 304 and the spare area 306 are alternated to store data that the host system 1000 writes into the flash memory storage device 100.

Figure 6:
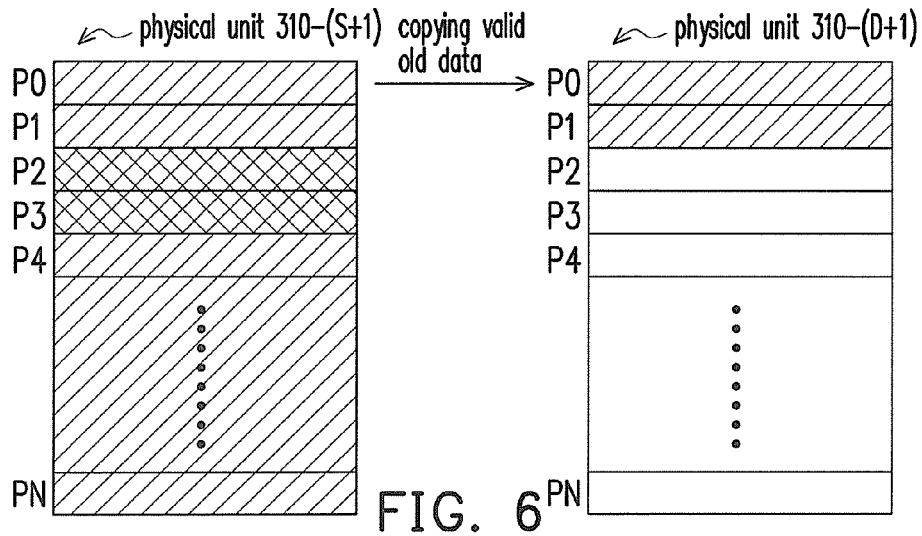
Figure 7:
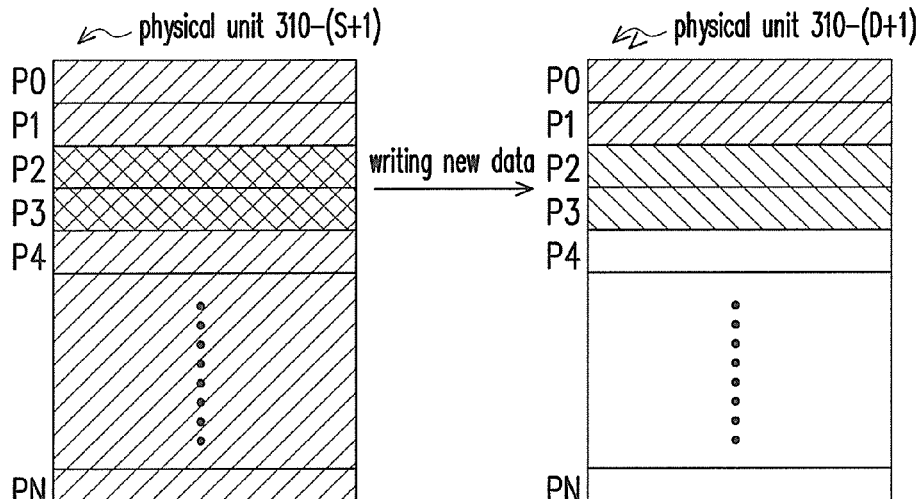
Figure 8:
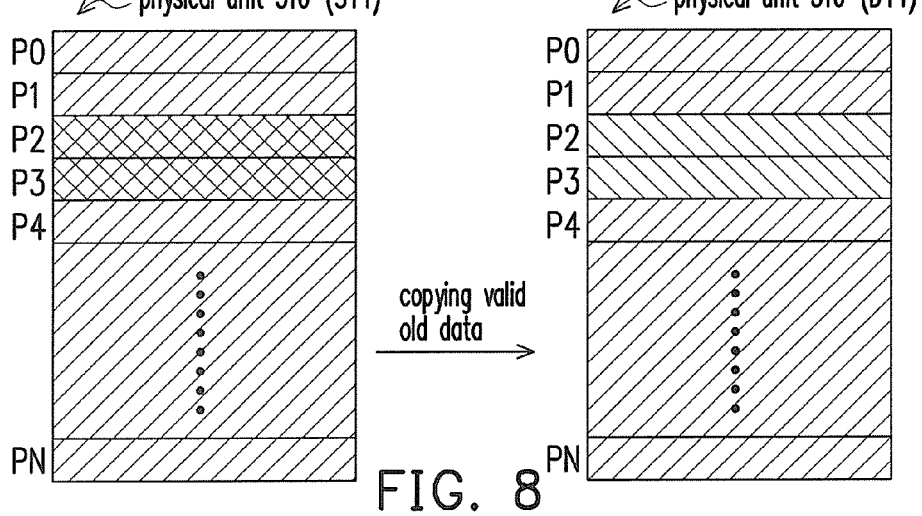

For instance, referring to FIGS. 6~8 simultaneously, when the flash memory controller 104 receives a host write command from the host system 1000 and writes data into the physical units 310-(S+1) of the data area 304, the memory management unit 204 gets the physical units 310-(D+1) from the spare area 306 to replace the physical units 310-(S+1) of the data area 304. However, when the memory management unit 204 writes new data into the physical unit 310-(D+1), the memory management unit 204 does not instantly move all the valid data in the physical unit 310-(S+1) to the physical unit 310-(D+1) and erase the physical unit 310-(S+1). More specifically, the memory management unit 204 copies the valid data to be written (i.e., Pages P0 and P1) from the physical unit 310-(S+1) to the physical unit 310-(D+1) (as shown in FIG. 6) and then writes the new data (i.e., Pages P2 and P3 of the physical unit 310-(D+1)) into the physical unit 310-(D+1) (as shown in FIG. 7). At this time, the memory management unit 204 completes the operation of writing. Since the valid data in the physical unit 310-(S+1) maybe becomes invalid in a next operation (for example, a write command), instantly moving all the valid data from the physical unit 310-(S+1) to the replacing physical unit 310-(D+1) is unnecessary. In the present exemplary embodiment, the action of temporarily maintaining this mother-child transient relationship (that is, the physical unit 310-(S+1) and the physical unit 310-(D+1)) is referred as opening mother-child units.

Thereafter, when the contents of the physical unit 310-(S+1) and the physical unit 310-(D+1) actually are combined, the memory management unit 204 integrates the physical unit 310-(S+1) with the physical unit 310-(D+1) into one physical unit, and thereby enhances efficiency of use of the blocks. Such an integration of the mother-child units is referred as closing mother-child units. For example, as shown in FIG. 8, when the mother-child units are closed, the memory management unit 204 copies the rest of the valid data (i.e., Pages P4~PN) of the physical unit 310-(S+1) to the replacing physical unit 310-(D+1), and then erases the physical unit 310-(S+1) and associates the physical unit 310-(S+1) to the spare area 306. Meanwhile, the physical unit 310-(D+1) is associated to the data area 304.

Accordingly, since the memory management unit 204 stores data by using the physical units alternately, the grouping relationship of the physical units being grouped into the system area 302, the data area 304, and the spare area 306 changes dynamically. It should be noted that FIGS. 6~8 are merely a writing example, and the invention is not limited thereto.

Referring to FIG. 5, since the physical units of the flash memory chip 106 is provided to the host system 1000 in the alternate manner for storing data, the memory management unit 204 then provides logical addresses to the host system 1000 to perform data access. In addition, as aforementioned, the memory management unit 204 manages the flash memory in units of physical units. Thus, the memory management unit 204 groups the logical addresses provided into logical units 350-(0)~350-(H). For instance, each of the logical addresses belongs to one of the logical units 350-(0)~350-(H), and when the host system 1000 desires to access a particular logical address, the memory management unit 204 identifies the logical unit of this logical address according to a configuration unit (not illustrated) or a calculation formula. Moreover, the physical unit mapped to this logical unit is identified according to the logical unit-physical unit mapping table. Afterwards, data are accessed on the flash memory chip 106 according to the mapping result. In particular, the logical units 350-(0) ~350-(H) are mapped to the physical units between the data area 304 and the cache area 308. For example, the logical units 350-(0)~350-(D) are mapped to the physical units of the data area 304 and the logical units 350-(D+1)~350-(H) are mapped to the physical units of the cache area 308. Additionally, the physical units of the backup information area 310 and the spare area 306 are not mapped to the logical units.

In another exemplary embodiment of the invention, the logical addresses of the logical units mapped to the physical units of the data area 304 are provided to the host system 1000 for accessing. The logical addresses of the logical units mapped to the physical units of the cache area 308 are not provided to the host system 1000 for accessing. In other words, the host system 1000 cannot give a command to store data into the cache area 308, and the cache area 308 is merely provided for the memory management unit 204 to use. For example, in an example where the data area 304 has a capacity of 128 G and the cache area 308 has a capacity of 1 G, when the flash memory storage device 100 is connected with the host system 1000, the host system 1000 identifies that the flash memory storage device 100 has a capacity of only 128 G.

The physical units logically belonging to the cache area 308 are used to backup data temporarily stored in the cache memory 108. The physical units logically belonging to the backup information area 310 are configured to store the related information regarding the data copied in the cache region 308.

In the present exemplary embodiment, when the microprocessor unit 202 receives a trigger signal, the memory management unit 204 then copies at least a portion, such as all or 80% of the data temporarily stored in the cache memory 108 into the cache area 308, and establishes a cache mapping table to record the mapping relationships for the data stored in the cache area 308. Here, the cache mapping table established is stored in the backup information area 310. Specifically, the memory management unit 204 writes at least a portion of the data temporarily stored in the cache memory 108 into the physical addresses of the cache area 308 consecutively. That is to say, when the data temporarily stored in the cache memory 108 includes a plurality of data belonging to different logical addresses within the same logical unit, the data are still written into the consecutive physical addresses within the cache area 308 sequentially. Notably, the data are not written into the cache area 308 with the methods illustrated in FIGS. 6~8.

Here, the trigger signal, for example, is a flush command transmitted by the host system 1000. In details, the flush command is transmitted to the flash memory storage device 100 by the host system 1000 to request the flushing of the data temporarily stored in the cache memory 108. In particular, when the power off operation is performed, the host system 1000 transmits the flush command to the flash memory storage device 100 to prevent the data temporarily stored in the cache memory 108 from losing after disconnection. In other words, in the example where the cache memory 108 temporarily stores a plurality of data written by the host system 1000, when the microprocessor unit 202 receives the flush command, the memory management unit 204 has to write the data that are temporarily stored in the cache memory 108 into the flash memory chip 106 immediately. In particular, when the microprocessor unit 202 receives the flush command, the memory management unit 204 then copies the data temporarily stored in the cache memory 108 into the cache area 308, and stores the cache mapping table recorded with the information of the data copied from the cache memory 108 in the backup information area 310. Since the memory management unit 204 quickly copies at least a portion of the data temporarily stored in the cache memory 108 into the consecutive addresses of the physical units of the cache area 308, the memory management unit 204 completes the data backup before the time out of the host system 1000 and transmits an acknowledge message stating the completion of the flush command to the host system 1000.

Figure 9:
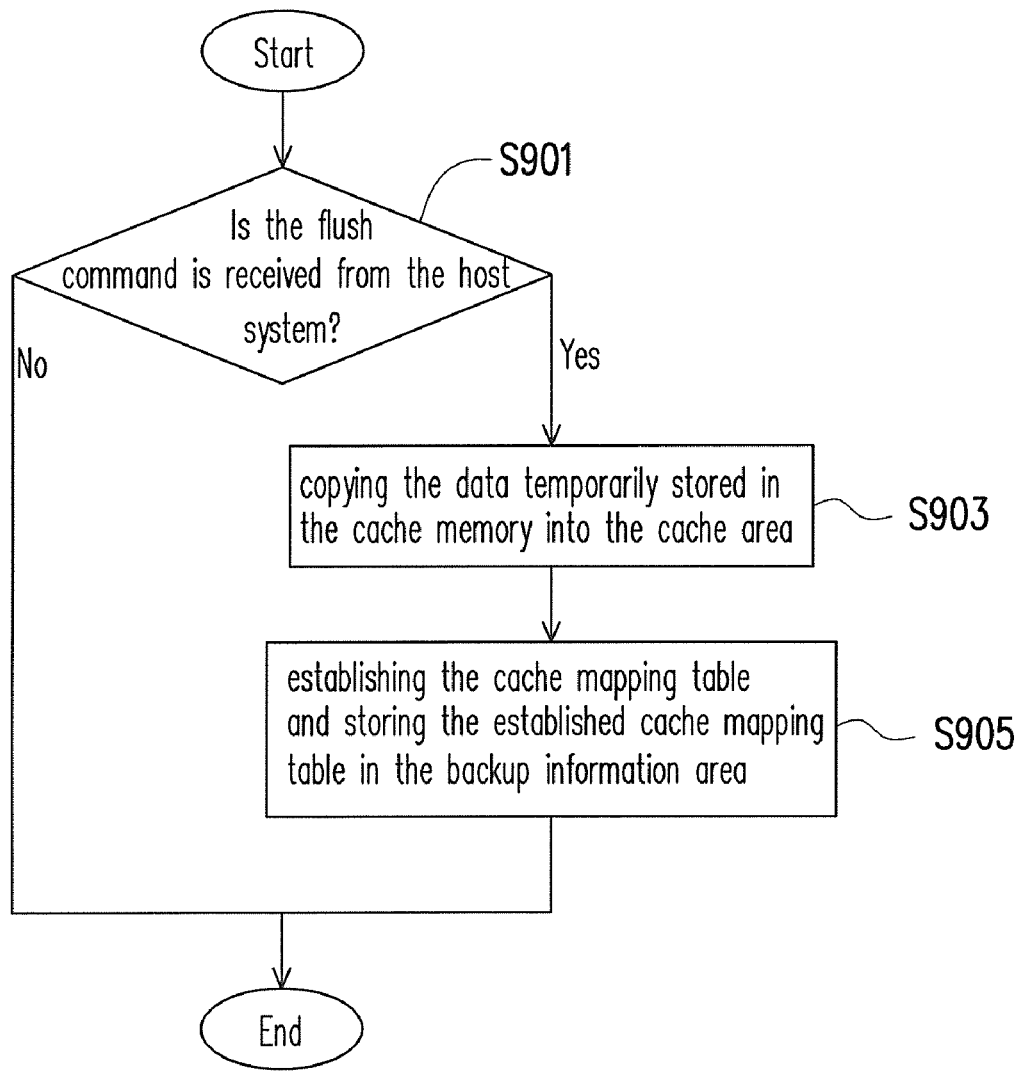
FIG. 9 is a flowchart illustrating a data backup method according to the first exemplary embodiment of the invention.

FIG. 9 is a flowchart illustrating a data backup method according to the first exemplary embodiment of the invention.

Referring to FIG. 9, in step S901, the memory management unit 204 determines whether the microprocessor unit 202 receives the flush command from the host system 1000. When the flush command is not received, the flowchart illustrated in FIG. 9 is terminated.

When the flush command is received, the memory management unit 204 then copies the data temporarily stored in the cache memory 108 into the cache area 308 in step S903. In step S903, for example, the memory management unit 204 starts to write the data temporarily stored in the cache memory 108 into the cache area 308 from an initial physical address of the cache area 308.

In step S905, the memory management unit 204 establishes the cache mapping table and stores the cache mapping table in the backup information area 310. The flowchart shown in the FIG. 9 is then terminated.

In the present exemplary embodiment, the cache mapping table has a mapping relationship field and a status field. The mapping relationship field records the corresponding logical addresses of the data temporarily stored in the cache memory 108. That is, the mapping relationship field is configured to record logical addresses that the data temporarily stored in the cache memory 108 belongs to. The status field records the status of the data temporarily stored in the cache memory 108. Specifically, when the data temporarily stored in the cache memory 108 are written into the data area 304, the status of the data is marked as invalid in the status field. On the contrary, when the data temporarily stored in the cache memory 108 are not written into the data area 304, the status of the data is marked as valid in the status field.

For instance, the data written by the host system 1000 is temporarily stored in the cache memory 108 and the memory management unit 204 has not yet completed the operation of writing the data into the data area 304 of the flash memory chip 106. Therefore, in the example of disconnecting and re-initiating the host system 1000, when the memory management unit 204 receives the power on signal, the memory management unit 204 loads the backup data from the cache area 308 into the cache memory 108. Afterwards, when the memory management unit 204 receives the host write command, the memory management unit 204 writes the data in the cache memory 108 into the data area 304 according to the information in the cache mapping table. In other words, only the data marked as valid in the cache mapping table are written into the data area 304.

It should be noted that in the present exemplary embodiment, the memory management unit 204 individually groups a portion of the physical units into the backup information area 310 to store the cache mapping table. Nevertheless, the invention is not limited thereto. In another exemplary embodiment of the invention, the cache mapping table is stored in the system area 302 or the data area 304, such that the backup information area 310 is not required.

Figure 10:
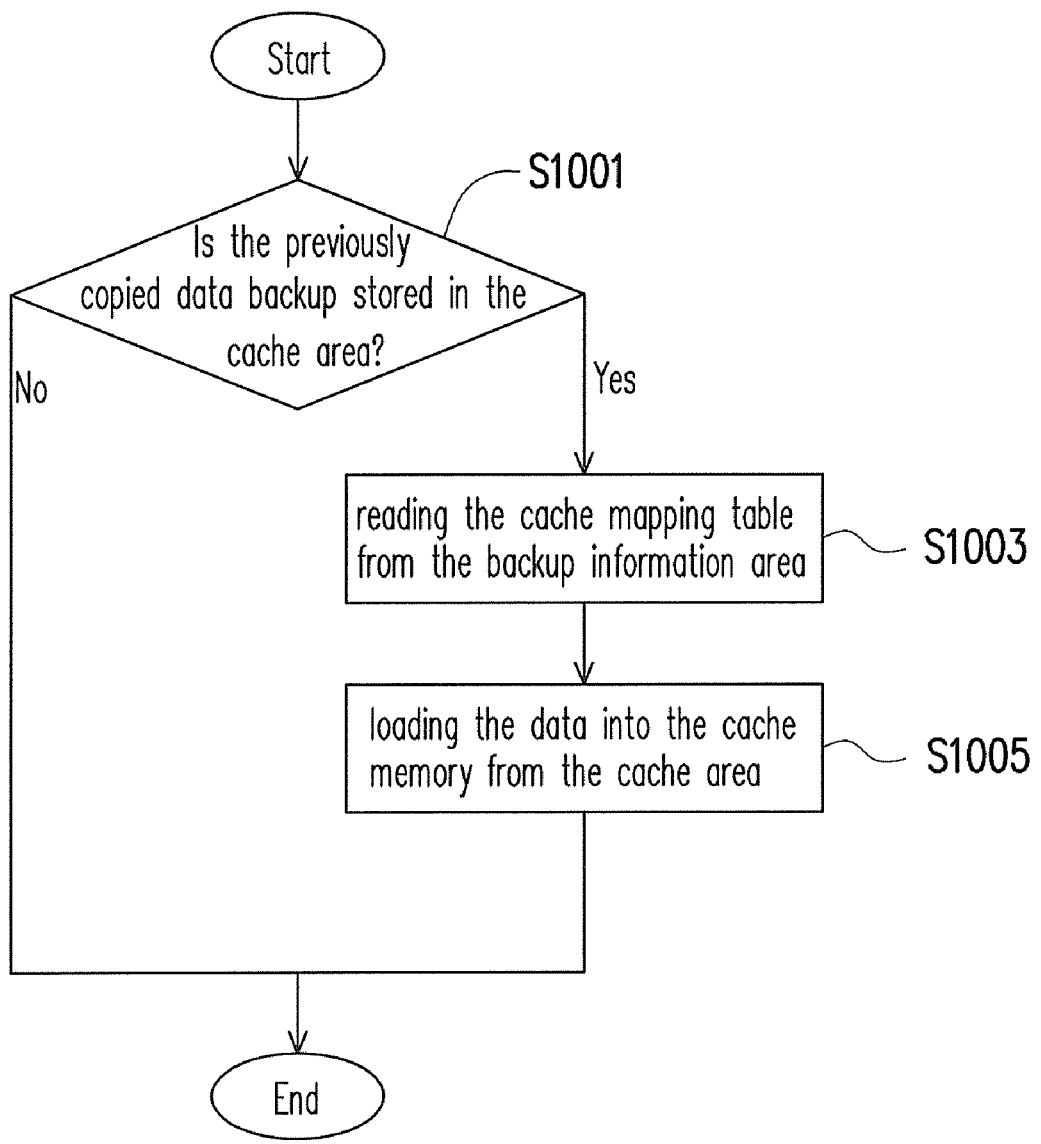
FIG. 10 is a flowchart illustrating a method of loading the backuped data after the host system and the flash memory storage device are re-initiated according to the first exemplary embodiment of the invention.

FIG. 10 is a flowchart illustrating a method of loading the copied data after the host system and the flash memory storage device are re-initiated according to the first exemplary embodiment of the invention.

Referring to FIG. 10, when the host system 1000 is re-initiated and the flash memory storage device 100 is turned on (i.e., when the memory management unit 204 receives the power on signal), in step S1001, the memory management unit 204 determines whether the backup data previously copied is stored in the cache area 308. When the backup data previously copied is not stored in the cache area 308, the flowchart illustrated in FIG. 10 is then terminated.

When the backup data previously copied is stored in the cache area 308, in step S1003, the memory management unit 204 reads the cache mapping table from the backup information area 310, and in step S1005, the memory management unit 204 loads the data from the cache area 308 into the cache memory 108. Thereafter, the memory management unit 204 writes at least a portion of the data in the cache memory 108 into the data area 304 of the flash memory chip 106 after the flash memory storage device 100 receives the host write command.

It should be noted that in the present exemplary embodiment, the memory management unit 204 initiates the mechanism for backing up the data in the cache memory 108 according to the flush command from the host system 1000. Nevertheless, it should be understood that the invention is not limited thereto. In another exemplary embodiment of the invention, for example, when the flash memory storage device 100 has a capacitor and the flash memory storage device 100 is disconnected, this capacitor is capable of providing power to the elements in the flash memory storage device 100 temporarily. The memory management unit 204 detects this event to initiate the mechanism of backing up the data in the cache memory 108. In particular, when the host system 1000 is disconnected and the power of the flash memory storage device 100 is switched to be provided by this capacitor, the power management unit 254 transmits a driving signal to the microprocessor unit 202, and the memory management unit 204 executes the steps illustrated in FIG. 9 according to this driving signal.

[Second Exemplary Embodiment]

A flash memory storage device and a host system in the second exemplary embodiment are essentially similar to the flash memory storage device and the host system in the first exemplary embodiment. Herein, the difference is that in the second exemplary embodiment, when the microprocessor unit receives the flush command, the memory management unit first tries to write the data in the cache memory into the data area. Moreover, the memory management unit only initiates the mechanism of backing up the data in the cache memory 108 when the writing operation cannot be completed within the predetermined time.

Figure 11:
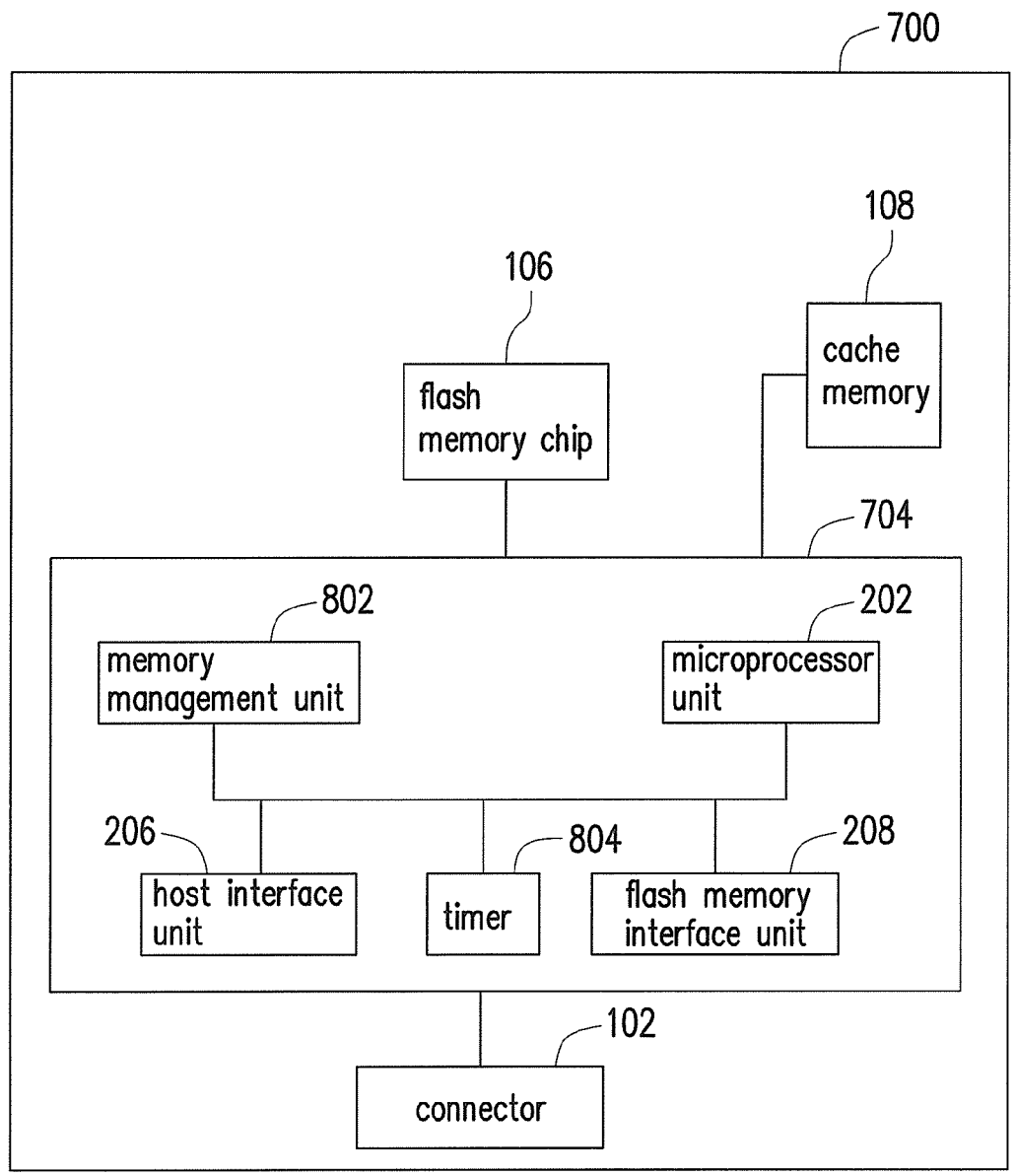
FIG. 11 is a schematic block diagram illustrating a flash memory storage device according to a second exemplary embodiment of the invention.

FIG. 11 is a schematic block diagram illustrating a flash memory storage device according to a second exemplary embodiment of the invention. The difference between the second exemplary embodiment and the first exemplary embodiment is illustrated in the following.

Referring to FIG. 11, the flash memory storage device 700 includes a connector 102, a flash memory controller 704, a flash memory chip 106, and a cache memory 108.

The flash memory controller 704 executes a plurality of logic gates or control commands implemented in a hardware form or a firmware form and performs various data operations such as data writing, reading, and erasing in the flash memory chip 106 according to commands of the host system 1000. The flash memory controller 704 includes the microprocessor unit 202, a memory management unit 802, the host interface unit 206, the flash memory interface unit 208, and a timer 804.

The memory management unit 802 is coupled to the microprocessor unit 202. The memory management unit 802 is essentially identical to the memory management unit 204. The difference between the memory management unit 802 and the memory management unit 204 is described in the following.

In the present exemplary embodiment, when the microprocessor 202 receives the flush command from the host system 1000, the memory management unit 802 initiates the timer 804 coupled to the microprocessor unit 202 to measure a time value. At the same time, the memory management unit 802 starts to write the data temporarily stored in the cache memory 108 into the data area 304 of the flash memory chip 106.

Specifically, during the period of writing the data temporarily stored in the cache memory 108 into the data area 304 of the flash memory chip 106, when the time value measured by the timer 804 exceeds a threshold value, the memory management unit 802 stops the writing operation, copies the data temporarily stored in the cache memory 108 into the cache area 308, and stores the cache mapping table recorded with the information of the copied data in the backup information area 310. Here, the threshold value is any suitable value. In the present exemplary embodiment, for instance, the threshold value is set to be 6 seconds.

In the present exemplary embodiment, the timer 804 is implanted in a hardware form. However, the invention is not limited thereto, and the timer 804 can also be implanted in a firmware form.

Figure 12:
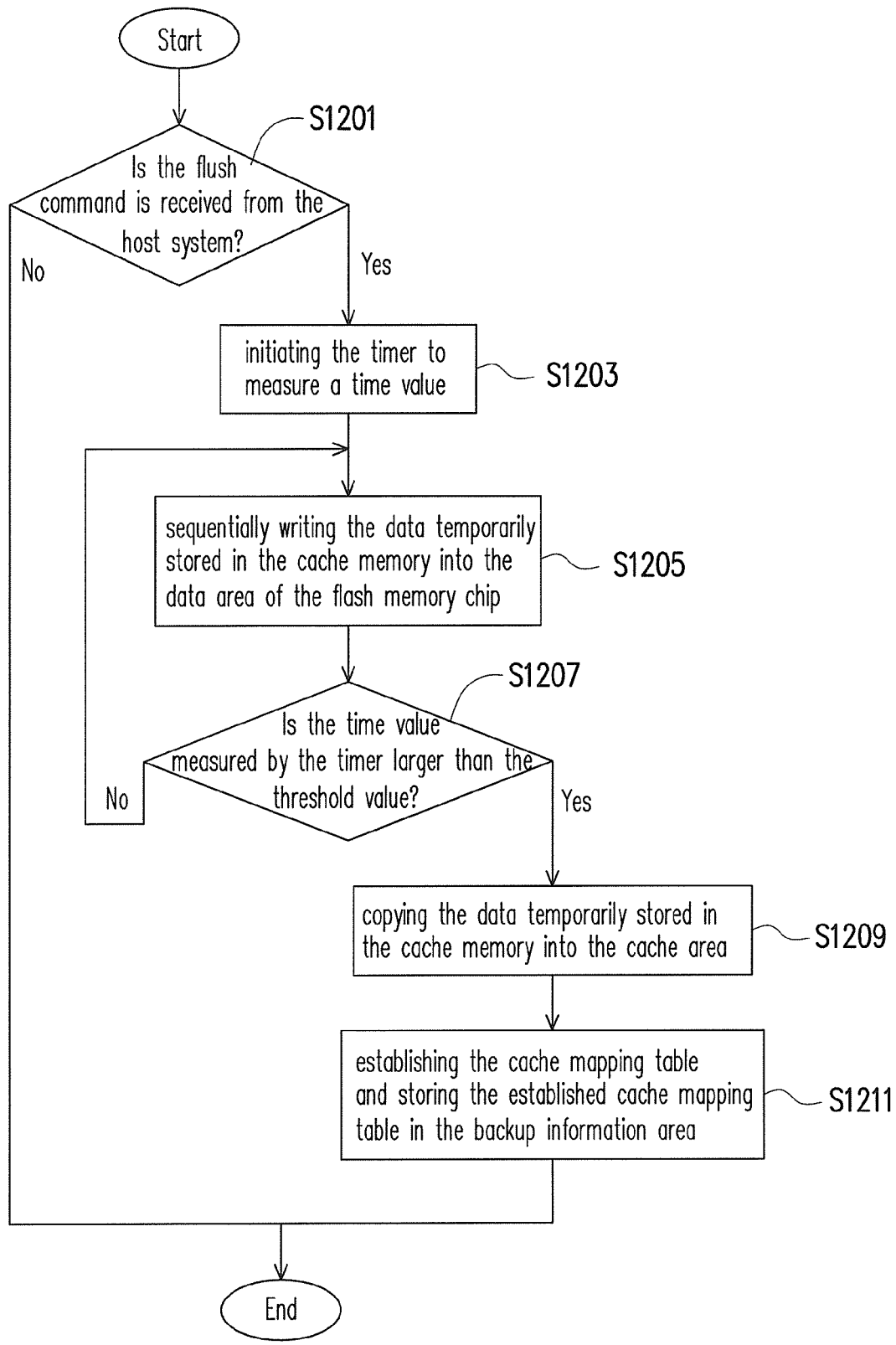
FIG. 12 is a flowchart illustrating a data backup method according to the second exemplary embodiment of the invention.

FIG. 12 is a flowchart illustrating a data backup method according to the second exemplary embodiment of the invention.

Referring to FIG. 12, in step S1201, the memory management unit 802 determines whether the microprocessor unit 202 receives the flush command from the host system 1000. When the flush command is not received, the flowchart illustrated in FIG. 12 is terminated.

When the flush command is received, the memory management unit 802 then initiates the timer 804 to measure a time value in step S1203.

Next, in step S1205, the memory management unit 802 sequentially writes the data temporarily stored in the cache memory 108 into the data area 304 of the flash memory chip 106. At the same time, the memory management unit 804 determines whether the time value measured by the timer 804 is larger than the threshold value in step S1207. When the time value measured by the timer 804 is not larger than the threshold value, step S1205 is then executed.

When the time measured by the timer 804 is larger than the threshold value, the memory management unit 802 then copies the data temporarily stored in the cache memory 108 into the cache area 308 in step S1209. In step S1209, for example, the memory management unit 802 starts to write the data temporarily stored in the cache memory 108 into the cache area 308 from an initial address of the cache area 308.

In step S1211, the memory management unit 204 establishes the cache mapping table and stores the cache mapping table established in the backup information area 310. The flowchart shown in the FIG. 12 is then terminated.

In summary, in the data backup method of the exemplary embodiment in the invention, the cache area is configured and the data temporarily stored in the cache memory is quickly copied to the cache area when the flush command is received. Moreover, the related information of the data copied is recorded simultaneously. By quickly storing the data temporarily stored in the cache memory, the problem of time out can therefore be prevented. In addition, the data temporarily stored in the cache memory is quickly copied to the cache area when the driving signal of the capacitor used is received. At the same time, the related information of the data copied is recorded so as to prevent the loss of data temporarily stored in the cache memory which results from abnormal disconnection. The previously described exemplary embodiments of the present invention have the advantages aforementioned, wherein the advantages aforementioned not required in all versions of the invention.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A data backup method for backing up a plurality of data stored in a cache memory of a flash memory storage device, wherein the flash memory storage device has a plurality of physical units and each of the physical units has a plurality of physical addresses, the data backup method comprising:

providing a plurality of logical addresses and grouping the logical addresses into a plurality of logical units;

logically grouping a portion of the physical units into a data area and a cache area by a flash memory controller, wherein the logical addresses are mapped to the data area or the cache area, and each of the data temporarily stored in the cache memory corresponds to one of the logical addresses mapped to the data area;

determining whether a trigger signal is received by the flash memory controller; and if the trigger signal is received, copying at least a portion of the data temporarily stored in the cache memory into the cache area by using the flash memory controller, wherein the data stored in the cache memory comprises at least one first data and one second data, and the first data and the second data are continuously written into adjacent physical addresses among the physical addresses of the cache area, and wherein the first data and the second data correspond to discontinuous logical addresses among the logical addresses within the same logical unit of the logical units respectively.

2. The data backup method as claimed in claim 1, further comprising:

when at least one host write command is received, writing the first data and the second data into the data area according to the logical addresses corresponding to the first data and the second data respectively.

3. The data backup method as claimed in claim 1, wherein the trigger signal is a flush command, wherein the flush command is transmitted by a host system coupled to the flash memory storage device.

4. The data backup method as claimed in claim 3, further comprising:
configuring a timer; and
turning on the timer to measure a time value when the trigger signal is received.

5. The data backup method as claimed in claim 4, wherein the step of copying the data stored in the cache memory into the cache area by using the flash memory controller is executed when the trigger signal is received and the time value is larger than a threshold value.

6. The data backup method as claimed in claim 1, wherein the flash memory storage device comprises a capacitor and the trigger signal is a driving signal, wherein the driving signal is transmitted to the flash memory controller when the capacitor begins to output power.

7. The data backup method as claimed in claim 1, further comprising:
establishing a cache mapping table by using the flash memory controller, wherein the cache mapping table is configured to record the logical addresses corresponding to the copied data and record a plurality of statuses of the copied data.

8. The data backup method as claimed in claim 7, further comprising:
logically grouping another portion of the physical units into a backup data area by using the flash memory controller; and
storing the cache mapping table into the backup data area by using the flash memory controller.

9. The data backup method as claimed in claim 1, wherein the logical addresses mapped to the cache area are not provided to a host system.

10. The data backup method as claimed in claim 1, further comprising:
loading the at least a portion of the data copied into the cache area into the cache memory when a power on signal is received.

11. The data backup method as claimed in claim 10, further comprising:
when at least one host write command is received, determining whether the at least a portion of the loaded data is valid; and
writing the at least a portion of the data into the data area from the cache memory when the at least a portion of the data loaded is valid.

12. The data backup method as claimed in claim 1, wherein the step of copying at least a portion of the data temporarily stored in the cache memory into the cache area by using the flash memory controller comprises:
writing the at least a portion of the data into the cache area from an initial physical address among the physical addresses of the cache area.

13. A flash memory controller configured in a flash memory storage device, wherein the flash memory storage device comprises a cache memory and a plurality of physical units, each of the physical units has a plurality of physical addresses, and the cache memory stores a plurality of data temporarily, the flash memory controller comprises:
a microprocessor unit;
a flash memory interface unit, coupled to the microprocessor unit and configured to couple to the physical units;
a host interface unit, coupled to the microprocessor unit and configured to couple to a host system; and
a memory management unit, coupled to the microprocessor unit and configured to provide a plurality of logical addresses and grouping the logical addresses into a plurality of logical units,
wherein the memory management unit logically groups a portion of the physical units into a data area and a cache area, the logical addresses are mapped to the data area or the cache area, and each of data temporarily stored in the cache memory corresponds to one of the logical addresses mapped to the data area,
wherein the memory management unit determines whether a trigger signal is received by the microprocessor unit, and if the trigger signal is received, the memory management unit copies at least a portion of the data temporarily stored in the cache memory into the cache area,
wherein the data temporarily stored in the cache memory comprises at least one first data and one second data, and the first data and the second data are continuously written into adjacent physical addresses among the physical addresses of the cache area, and
wherein the first data and the second data correspond to discontinuous logical addresses among the logical addresses within the same logical unit of the logical units respectively.

14. The flash memory controller as claimed in claim 13, wherein when at least one host write command is received, the memory management unit writes the first data and the second data into the data area according to the logical addresses corresponding to the first data and the second data respectively.

15. The flash memory controller as claimed in claim 13, wherein the trigger signal is a flush command and the flush command is transmitted through the host interface unit to the microprocessor unit by the host system.

16. The flash memory controller as claimed in claim 15, further comprising a timer,
wherein when the microprocessor unit receives the trigger signal, the memory management unit turns on the timer to measure a time value.

17. The flash memory controller as claimed in claim 16, wherein the memory management unit copies the data stored in the cache memory into the cache area when the trigger signal is received and the time value is larger than a threshold value.

18. The flash memory controller as claimed in claim 13, further comprising a power management unit coupled to the microprocessor unit, wherein the flash memory storage device comprises a capacitor coupled to the power management unit,
wherein the trigger signal is a driving signal and when the capacitor begins to output power, the power management unit transmits the driving signal to the microprocessor unit.

19. A flash memory storage system, comprising:
a flash memory chip, having a plurality of physical units;
a connector, configured to couple to a host system;
a flash memory controller, coupled to the flash memory chip and the connector and configured to provide a plurality of logical addresses and group the logical addresses into a plurality of logical units; and
a cache memory coupled to the flash memory controller and configured to store a plurality of data temporarily, wherein the flash memory controller logically groups a portion of the physical units into a data area and a cache area, wherein the logical addresses are mapped to the data area or the cache area, and each of data temporarily stored in the cache memory corresponds to one of the logical addresses mapped to the data area, wherein the flash memory controller determines whether a trigger signal is detected, and if the trigger signal is detected, the flash memory controller copies at least a portion of the data temporarily stored in the cache memory into the cache area, wherein the data temporarily stored in the cache memory comprises at least one first data and one second data, and the first data and the second data are continuously written into adjacent physical addresses among the physical addresses of the cache area, wherein the first data and the second data correspond to discontinuous logical addresses among logical addresses within the same logical unit of the logical units respectively, and wherein when at least one host write command is received, the flash memory controller writes the first data and the second data into the data area according to the logical addresses corresponding to the first data and the second data respectively.

20. The flash memory storage system as claimed in claim 19, wherein the trigger signal is a flush command and the flush command is transmitted through the connector to the flash memory controller by the host system.

* * * * *